US007877283B2

(12) United States Patent
Dreiling et al.

(10) Patent No.: US 7,877,283 B2
(45) Date of Patent: Jan. 25, 2011

(54) MULTI-PERSPECTIVE BUSINESS PROCESS CONFIGURATION

(75) Inventors: Alexander Dreiling, Paddington (AU); Michael Rosemann, Windsor (AU); Karsten A. Schulz, Middle Park (AU); Wasim Sadiq, Westlake (AU)

(73) Assignee: SAP AG, Walldorf (DE)

( * ) Notice: Subject to any disclaimer, the term of this patent is extended or adjusted under 35 U.S.C. 154(b) by 1792 days.

(21) Appl. No.: 11/026,596

(22) Filed: Dec. 30, 2004

(65) Prior Publication Data

US 2006/0149568 A1 Jul. 6, 2006

(51) Int. Cl.
*G06Q 10/00* (2006.01)
(52) U.S. Cl. .................................... 705/9; 717/143
(58) Field of Classification Search ............... 705/7–10
See application file for complete search history.

(56) References Cited

U.S. PATENT DOCUMENTS

| | | | | |
|---|---|---|---|---|
| 5,870,746 A * | 2/1999 | Knutson et al. | ............ | 707/101 |
| 6,560,774 B1 * | 5/2003 | Gordon et al. | ............ | 717/146 |
| 2003/0184581 A1 * | 10/2003 | Bawa | ............ | 345/736 |
| 2004/0083199 A1 * | 4/2004 | Govindugari et al. | ......... | 707/1 |
| 2005/0091093 A1 * | 4/2005 | Bhaskaran et al. | ............ | 705/7 |
| 2005/0120332 A1 * | 6/2005 | Martin et al. | ............... | 717/105 |

OTHER PUBLICATIONS

"CA Heads Into the Next Dimension," Information Week, p. 186+, May 8, 2000.*

* cited by examiner

*Primary Examiner*—Beth V Boswell
*Assistant Examiner*—Adrian J McPhillip
(74) *Attorney, Agent, or Firm*—Schwegman, Lundberg & Woessner, P.A.

(57) ABSTRACT

A computer-implemented method for configuring a business process includes configuring a solution map and deriving a pre-configured set of collaborative business scenarios based on the solution map. The pre-configured set of collaborative business scenarios is then configured and a pre-configured set of event driven process chains is derived based on the configured set of collaborative business scenarios. Finally, the pre-configured set of event driven process chains is configured.

10 Claims, 18 Drawing Sheets

MULTI-PERSPECTIVE BUSINESS PROCESS CONFIGURATION

DESCRIPTION OF THE RELATED ART

Implementation of enterprise resource planning ("ERP") software is a major undertaking for a business organization. Typically, this implementation affects all aspects of the organization. As a result, failure to correctly and timely execute the implementation can have far-reaching consequences.

There are various reasons and pitfalls that can potentially impede a successful ERP software installation. One reason could be that the implementation partners do not have a correct grasp of the organization's business requirements, either through their own fault or perhaps an organization not effectively communicating to the installers due to varying levels of abstraction of end users. This can result in an incorrect implementation and would thus require an expensive fix to resolve the issues. Alternatively, ERP software itself could be the culprit in preventing a successful installation. If the ERP software is not flexible enough to be applied to the organizational requirements, delays will more than likely occur.

Configuration of the internal processes of enterprise systems is made on different hierarchical levels within an organization. For example, the senior management will influence the configuration process on a more abstract level whereas technical analysts need a very detailed description of the process in order to perform configuration. Hence, their requirements towards the presentation need to be different (abstract, easy to understand models for the senior management, detailed technical descriptions for technical analysts, detailed business processes for business analysis). The problem from using different languages to support the different types of decision makers within an enterprise configuration process is then to integrate these models in order to establish a communication basis between the types of decision makers. An absence of such a communication basis will ultimately lead to the loss of configuration at the different managerial levels.

In view of the foregoing, it may be useful to provide methods and systems that facilitate a flexible installation of ERP software that allows for varying levels of abstraction.

SUMMARY OF EMBODIMENTS OF THE INVENTION

The present invention is described and illustrated in conjunction with systems, tools and methods of varying scope which are meant to be exemplary and illustrative, not limiting in scope.

A computer-implemented method for configuring a business process, in accordance with an exemplary embodiment, includes configuring a solution map and deriving a pre-configured set of collaborative business scenarios based on the solution map. The pre-configured set of collaborative business scenarios is then configured and a pre-configured set of event driven process chains is derived based on the configured set of collaborative business scenarios. Finally, the pre-configured set of event driven process chains is configured.

A computer-implemented method for configuring a business process, in accordance with another exemplary embodiment, includes configuring a solution map based on a business blueprint and deriving a pre-configured set of collaborative business scenarios based on the solution map. Deriving the pre-configured set of collaborative business scenarios includes identifying one or more impacted collaborative business scenarios, making changes to the one or more impacted collaborative business scenarios based on the configured solution map; and re-establishing consistency in a collaborative business scenario model-base. The pre-configured set of collaborative business scenarios is configured and this configuration involves performing a high-level business process analysis and configuring the pre-configured set of collaborative business scenarios based on the high-level business process analysis. A pre-configured set of event driven process chains is derived based on the configured set of collaborative business scenarios wherein deriving the pre-configured set of event driven process chains includes identifying one or more impacted event driven process chains, making changes to the one or more impacted event driven process chains based on the configured set of collaborative business scenarios and re-establishing syntactical consistency in an event driven process chain model-base. Finally, the pre-configured set of event driven process chains is configured by performing detailed-level analysis and configuring the pre-configured set of event driven process chains based on the detailed-level business process analysis.

In addition to the aspects and embodiments of the present invention described in this summary, further aspects and embodiments of the invention will become apparent by reference to the drawings and by reading the detailed description that follows.

DETAILED DESCRIPTION

An aspect of the present invention contemplates a variety of methods, systems and data structures for configuring a business process. By utilizing a solution map that fully describes how a business functions in conjunction with a pre-configured set of collaborative business scenarios ("CBS")/models, an organization can efficiently and correctly be outfitted with ERP software. As a result, the typical inefficiencies and pitfalls associated with prior art ERP software implementation is avoided.

Figure 1:
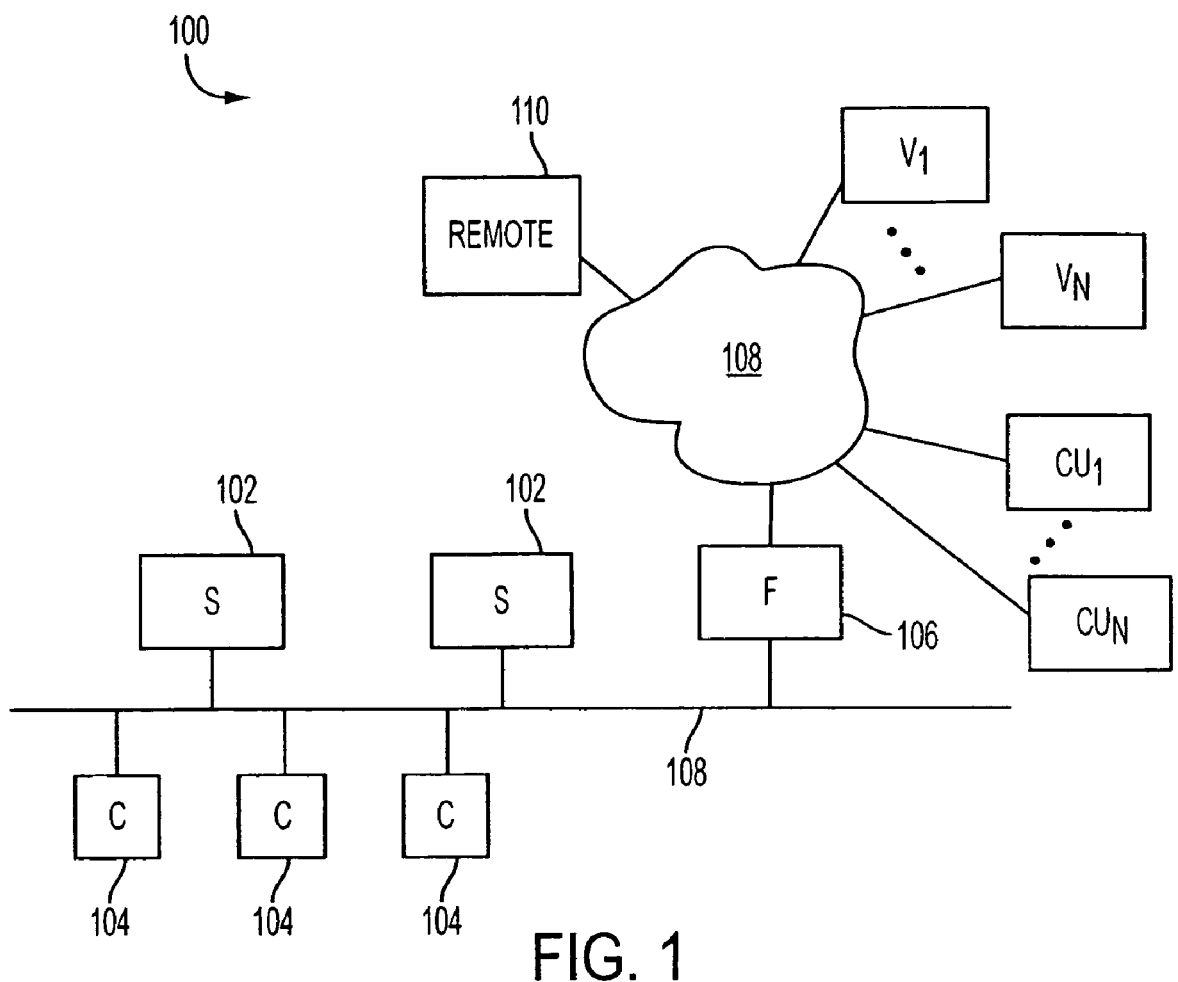
FIG. 1 is a block diagram illustrating a typical network of an organization.

FIG. 1 is a block diagram illustrating a typical network of an organization 100. Included in architecture 100 are multiple servers 102, multiple clients 104, a firewall 106, all of which are bi-directionally coupled via a local area network 108. Also included is a network 108 that allows for communication with a number of vendors $V_1$ through $V_N$ and customers $CU_1$ through $CU_N$. Additionally, communication can be initiated with local area network 108 from remote site 110, via network 108 and firewall 106. Architecture 100 forms the basis for an organization to perform its required tasks such as procurement and shipping.

Figure 2:
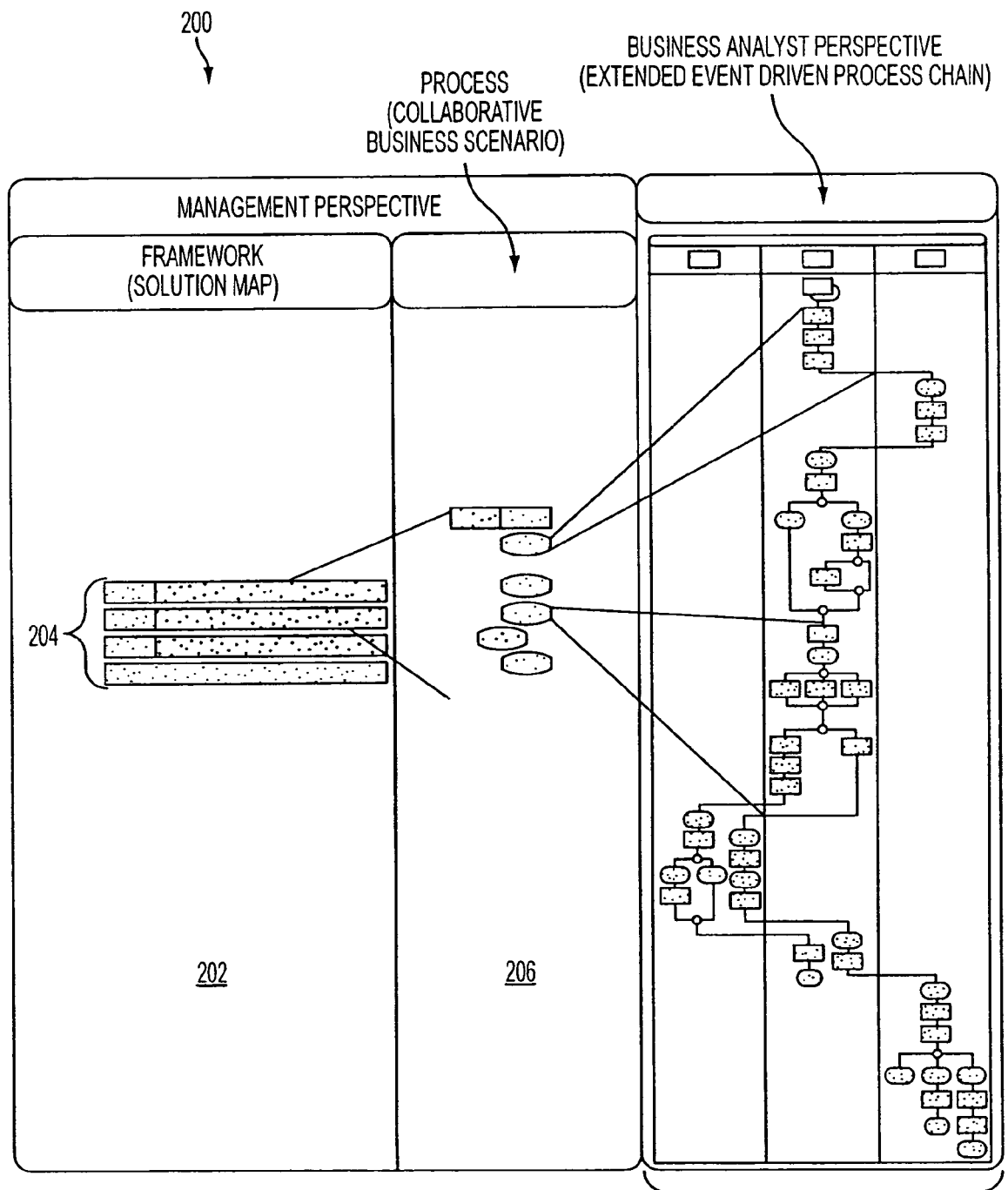
FIG. 2 is a block diagram illustrating integrated process models, in accordance with an exemplary embodiment.

FIG. 2 is a block diagram 200 illustrating integrated process models, in accordance with an exemplary embodiment. Integrated process models allow for varying degrees of abstraction. For example, region 202 illustrates a high-level solution map of an organizational framework. This particular region only shows the core process models 204. Region 206 expounds on models 204 by showing them in greater detail as collaborative business scenarios (CBS). Finally, the greatest level of detail is displayed in region 208. Region 208 shows how the model 204 interacts as a detailed process model. Typically, region 208 is the preferred view of a business analyst while region 202 is the view preferred by management.

It should be noted that various terms and phrases are used to describe exemplary aspects. However, these terms are merely descriptive and other equivalent terms and phrases can be substituted without departing from the spirit and scope of the present invention. For example, "solution map" could alternately be phrased as "models for the management perspective," "collaborative business scenarios" could perhaps be referred to as "models for the technical analyst perspective" and "event-driven process chain" could also be referred to as "models for the business analyst perspective."

Figure 3:
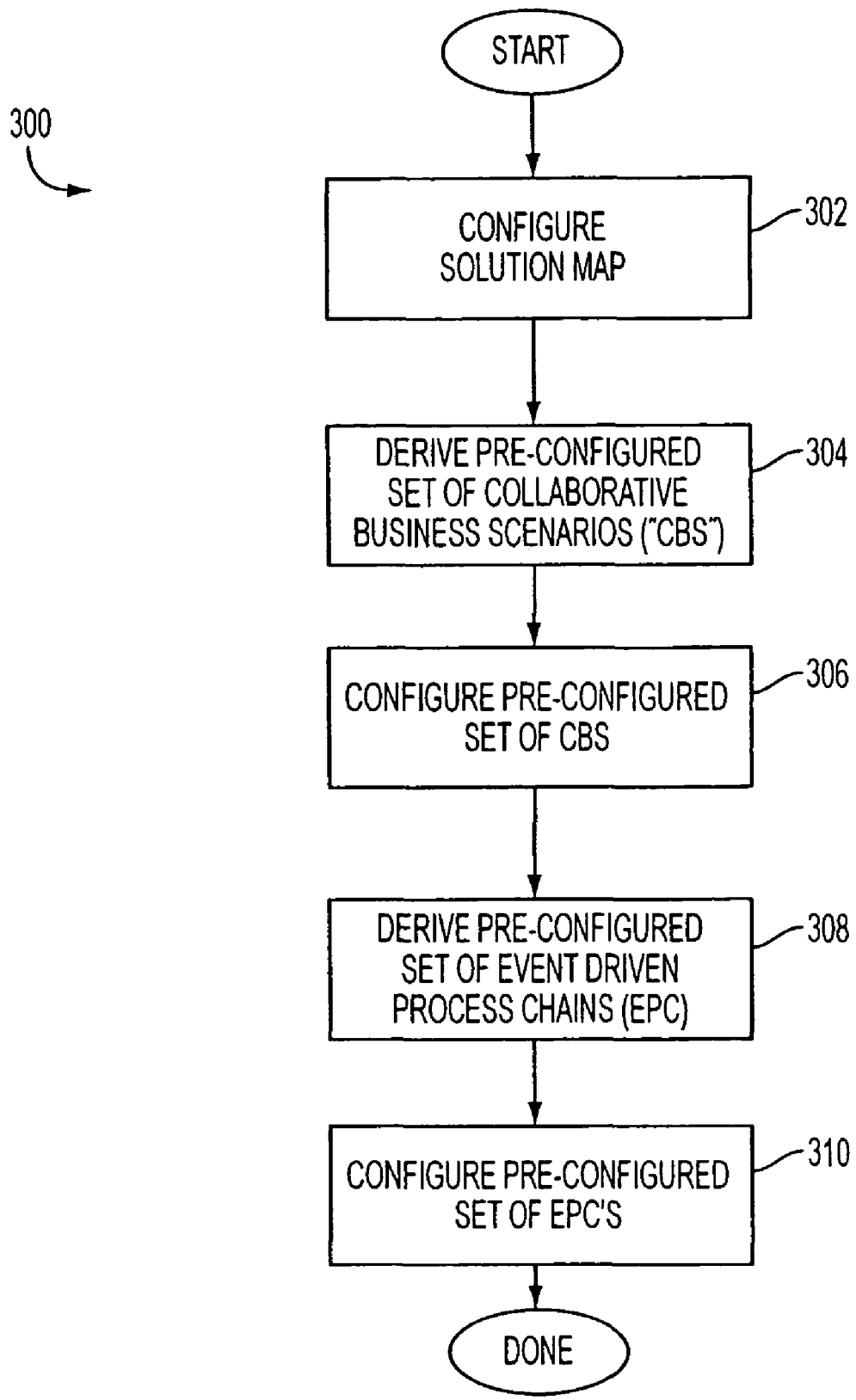
FIG. 3 is a flowchart illustrating a process for configuring a business process, in accordance with an exemplary embodiment.

FIG. 3 is a flowchart illustrating a process 300 for configuring a business process, in accordance with an exemplary embodiment. After a start operation, a solution map is configured and a pre-configured set of CBS's is derived based on the solution map, at operations 302 and 304. The pre-configured set of CBS's is then configured and a pre-configured set of EPC's is derived, based on the configured set of CBS's, at operations 306 and 308. Finally, at operation 310, the pre-configured set of EPC's is configured and process 300 is then complete. Each of the various operations of process 300 will be explained in greater detail subsequently.

Figure 4:
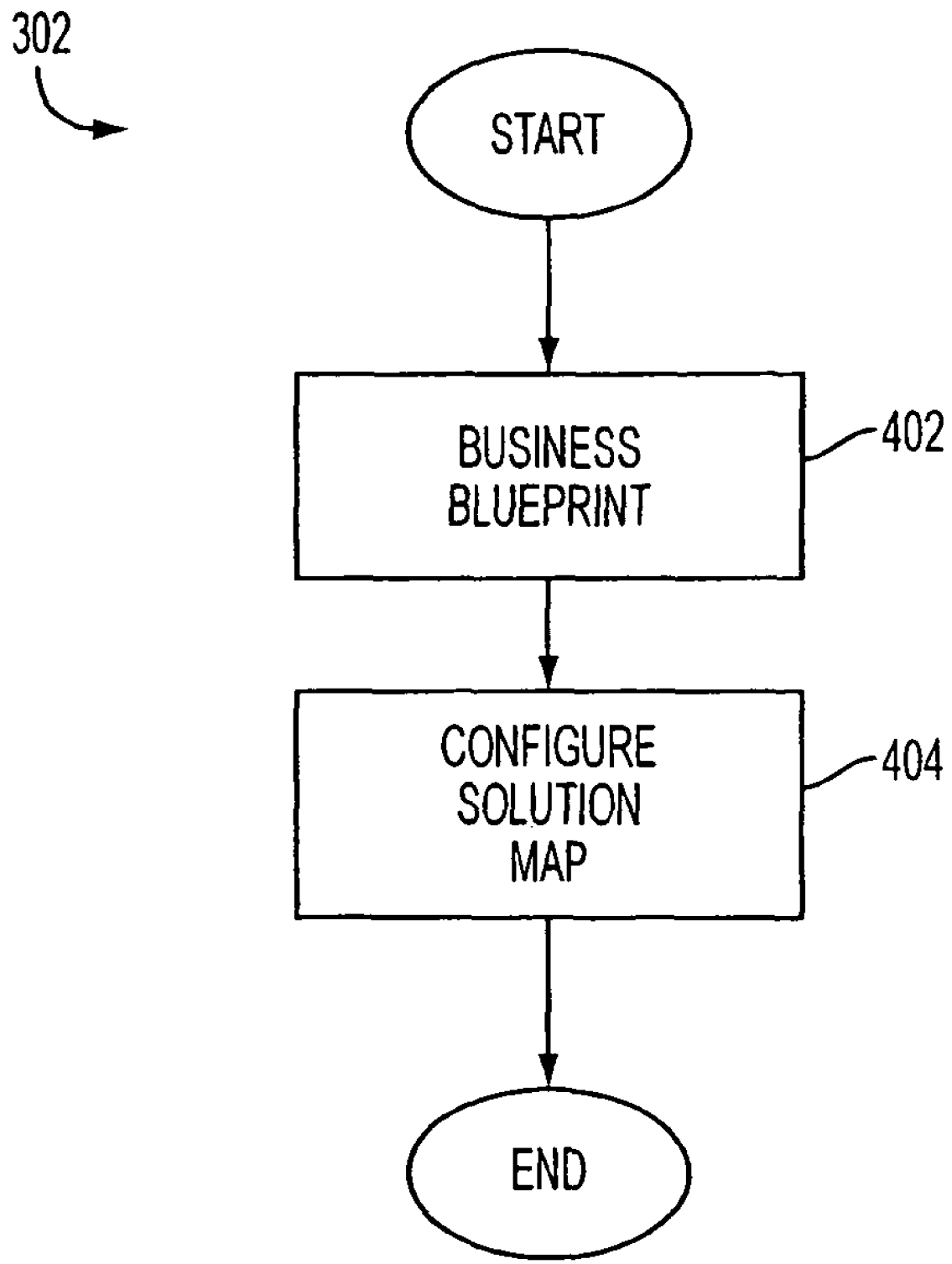
FIG. 4 is a flowchart further illustrating the process 302 for configuring a solution map of FIG. 3; in accordance with an exemplary embodiment.
Figure 5:
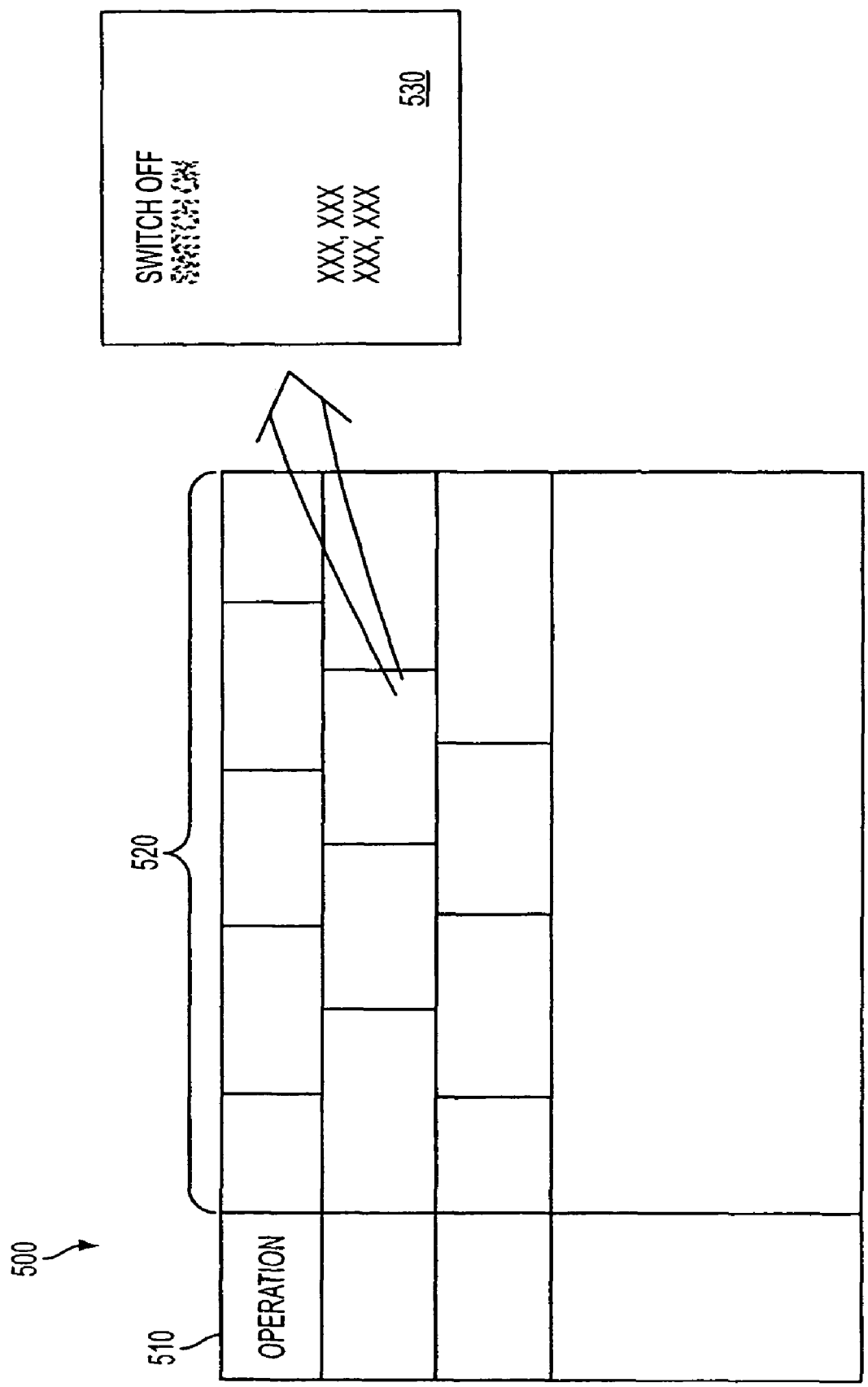
FIG. 5 illustrates an exemplary solution map, in accordance with an exemplary embodiment.

FIG. 4 is a flowchart further illustrating the process 302 for configuring a solution map of FIG. 3; in accordance with an exemplary embodiment. After a start operation, a business blueprint is obtained at operation 402. The business blueprint details all of the various processes of a business organization. Using the blueprint, a solution map, used to implement ERP software, is then configured at an operation 404. FIG. 5 illustrates an exemplary solution map 500, in accordance with an exemplary embodiment. Solution map 500 includes a list of various operations 510 along with the various tasks 520 associated with each individual operation 510. A detail 530 of the tasks 520 can further be displayed by clicking on the individual task 520.

Figure 6:
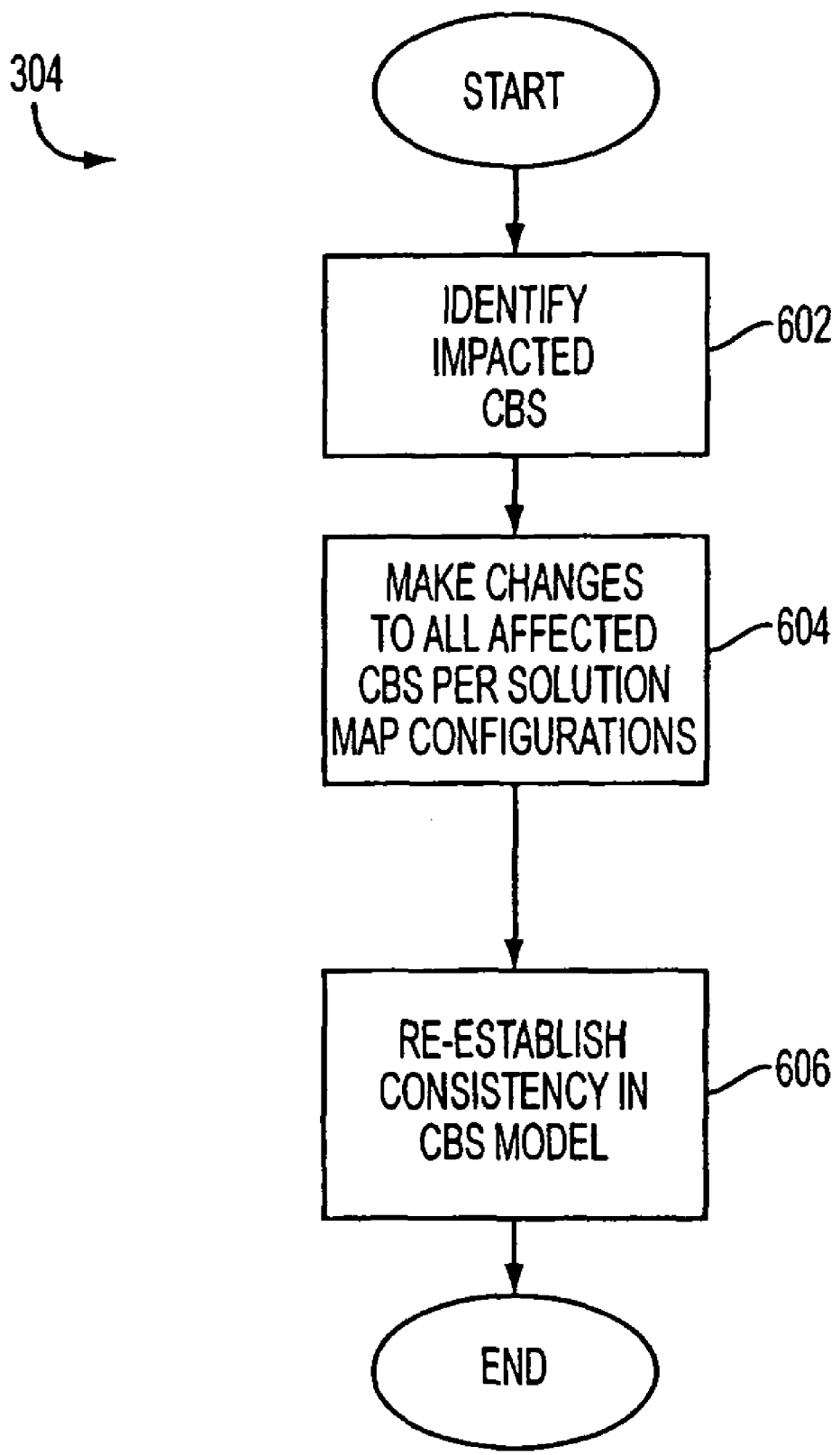
FIG. 6 is a flowchart further illustrating the process 304 for deriving a pre-configured set of collaborative business scenarios of FIG. 3, in accordance with an exemplary embodiment.

FIG. 6 is a flowchart further illustrating the process 304 for deriving a pre-configured set of collaborative business scenarios of FIG. 3, in accordance with an exemplary embodiment. First, impacted collaborative business scenarios are identified, at an operation 602, and changes are made to the affected CBS's as defined by the solution map, at operation 604. After the changes are affected, consistency is re-established in the model. The "pre-configured" set of collaborative business scenarios is in a state as to define a generic organization. By configuring the pre-configured set of CBS's, the CBS's are customized to match the targeted business organization.

Figure 7:
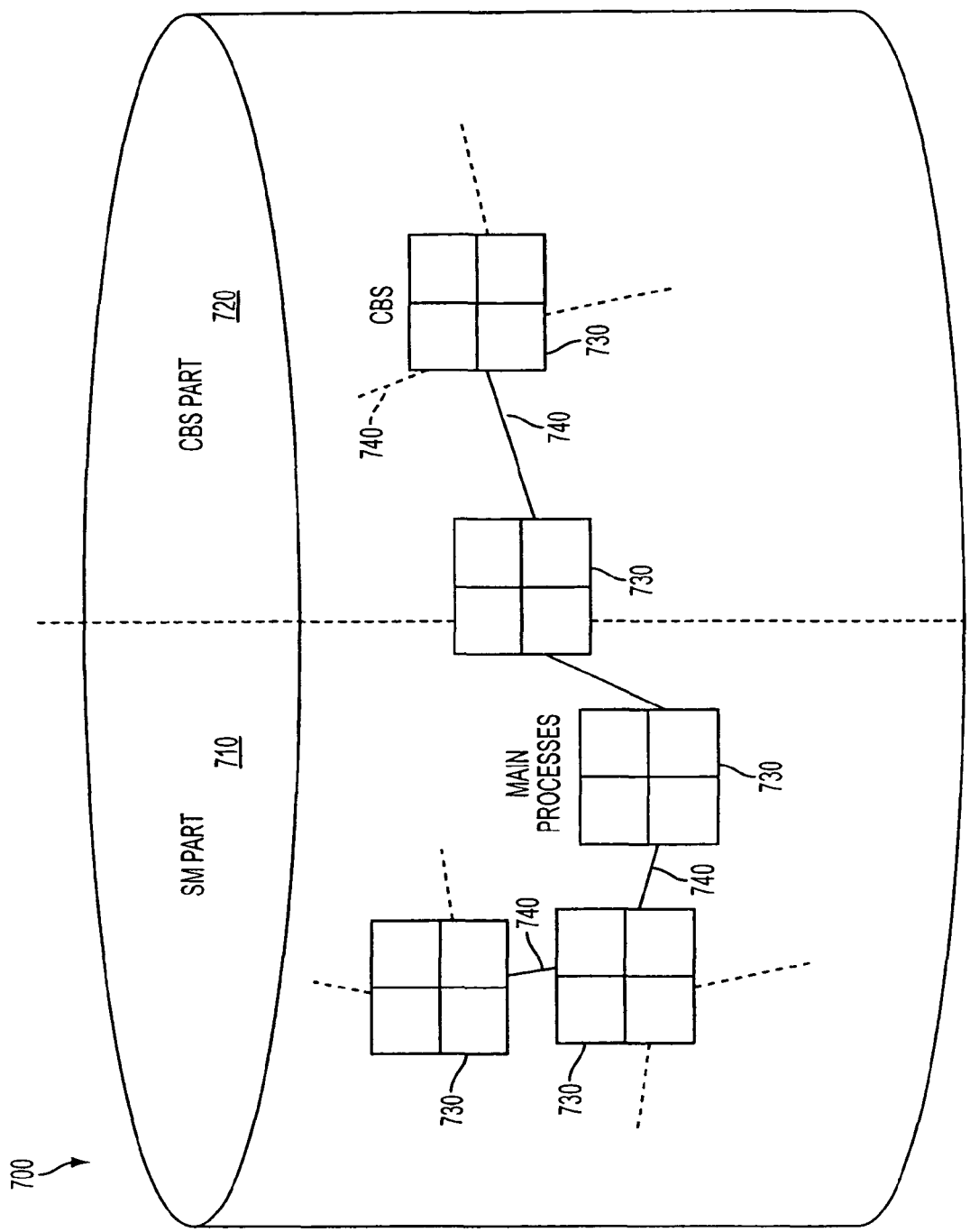
FIG. 7 illustrates a linked database that defines software functionality, in accordance with an exemplary embodiment.

FIG. 7 illustrates a linked database 700 that defines software functionality, in accordance with an exemplary embodiment. Linked database 700 is divided into two portions: a solution map portion 710 and a CBS portion 720. Tables 730 define various operations and associated tasks and links 740 define how these various operations are organized in relation to each other.

Figure 8:
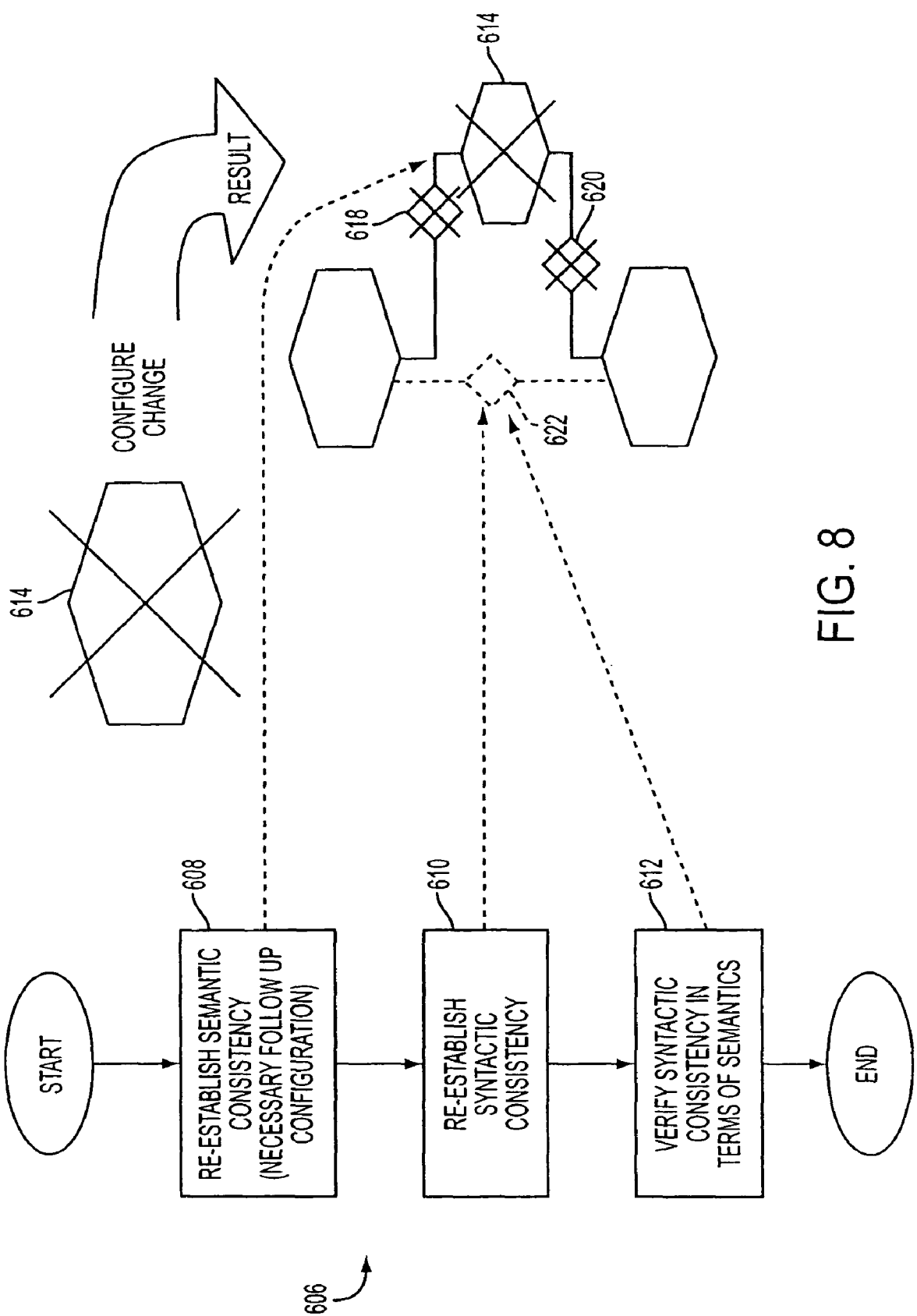
FIG. 8 is a flowchart further illustrating the process 606 for re-establishing consistency in the collaborative business scenario-base of FIG. 6, in accordance with an exemplary embodiment.

FIG. 8 is a flowchart further illustrating the process 606 for re-establishing consistency in the collaborative business scenario-base of FIG. 6, in accordance with an exemplary embodiment. After a start operation, semantic consistency is re-established via an operation 608. Semantic consistency refers to the necessary removal of functions resulting from the deletion of a related function. After operation 608, syntactic consistency is re-established and is verified in terms of the semantics, at operations 610 and 612. Syntactic consistency is the necessity to conform to the rules of modeling technique. To further illustrate, a software operation 614 is deleted. As a result, operations 618 and 620 also need to be deleted. Operation 622 was created to replace operations 618, 614 and 620.

Figure 9:
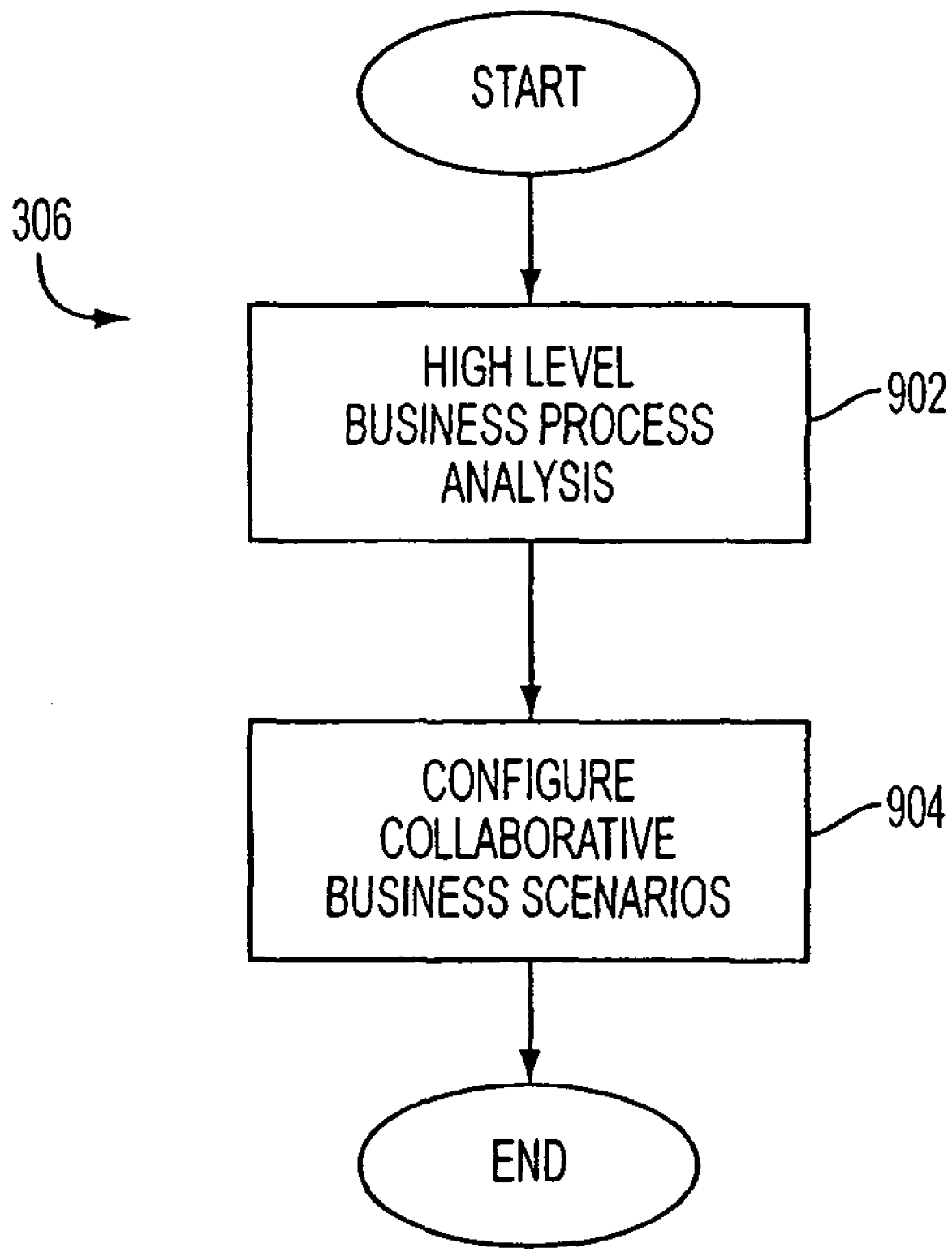
FIG. 9 is a flowchart further illustrating the process 306 for configuring the pre-configured set of collaborative business scenarios of FIG. 3, in accordance with an exemplary embodiment.
Figure 10:
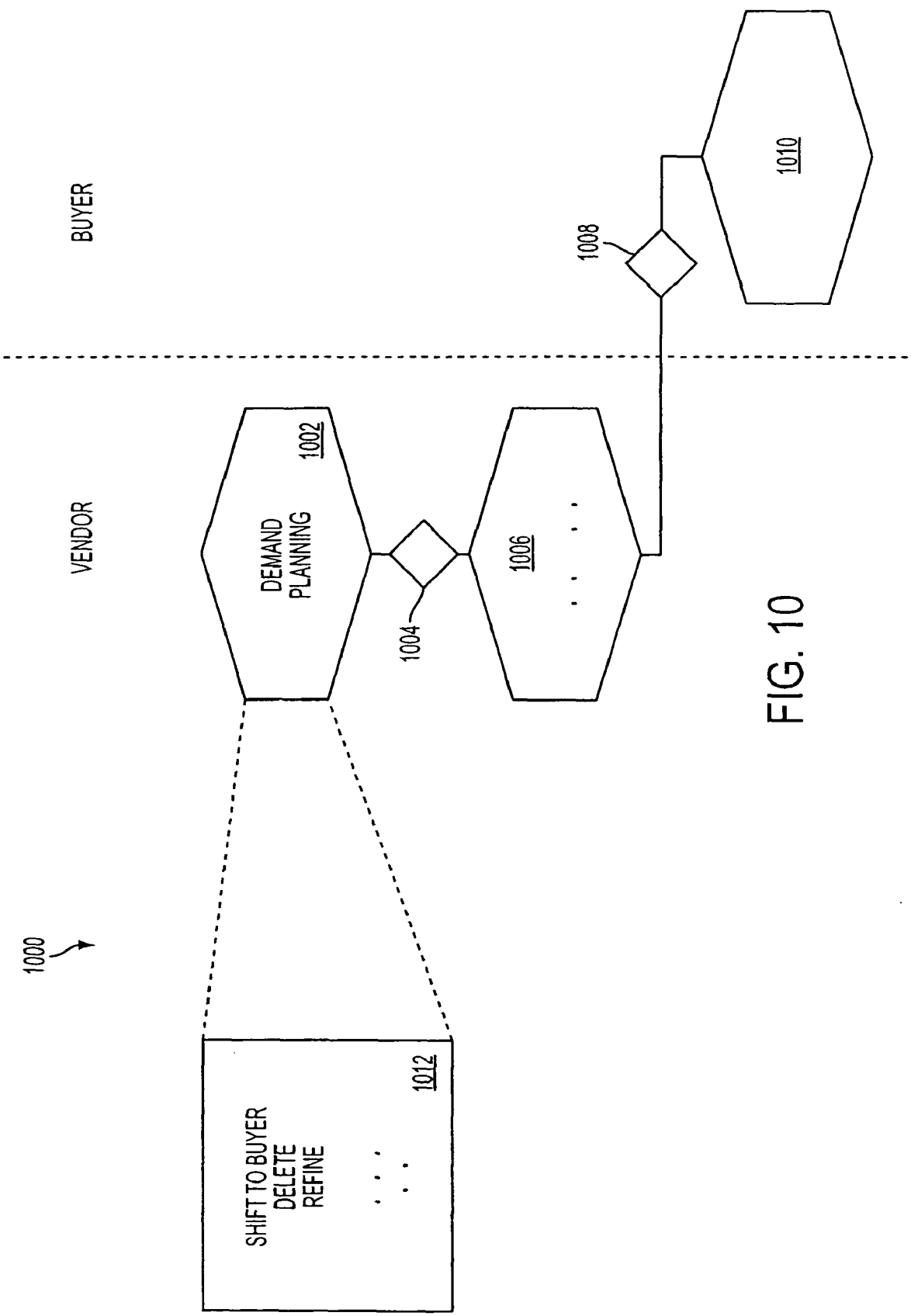
FIG. 10 is an exemplary block diagram illustrating how collaborative business scenarios are configured, in accordance with an exemplary embodiment.

FIG. 9 is a flowchart further illustrating the process 306 for configuring the pre-configured set of collaborative business scenarios of FIG. 3, in accordance with an exemplary embodiment. A high-level business process analysis is undertaken, at an operation 902, and then pre-configured CBS's are configured based on the analysis, at an operation 904. FIG. 10 is an exemplary block diagram 1000 illustrating how collaborative business scenarios are configured, in accordance with an exemplary embodiment. In diagram 1000, a demand planning operation 1002 is defined on a vendor side of operations. Related operations 1004, 1006, 1008 and 1010 are also defined. At a point in between operations 1006 and 1008, control of the process is turned over to a buyer. Operation 1002 can be further defined in box 1012.

Figure 11:
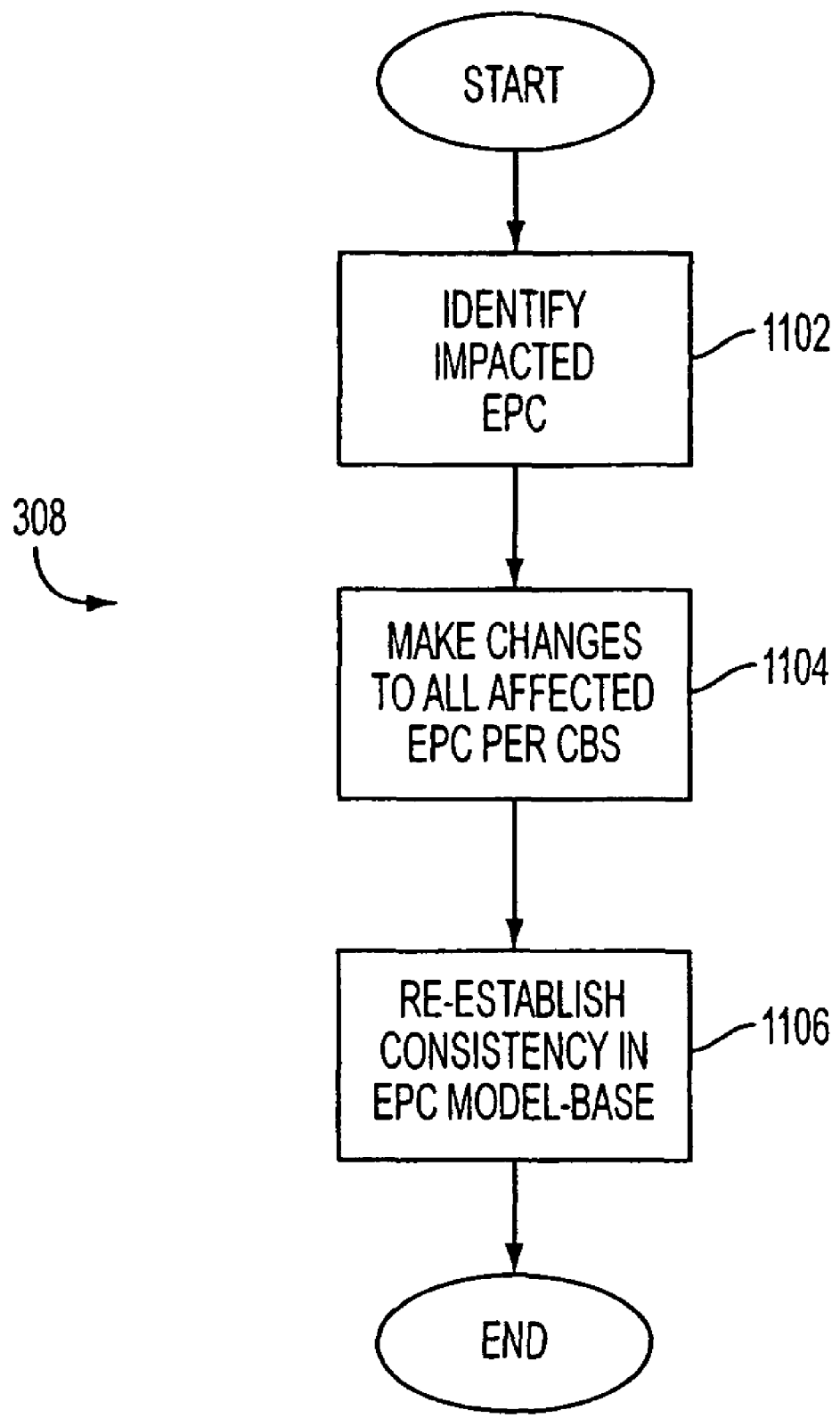
FIG. 11 is a flowchart further illustrating a process 308 for deriving the pre-configured set of event driven process chains of FIG. 3, in accordance with an exemplary embodiment.
Figure 12:
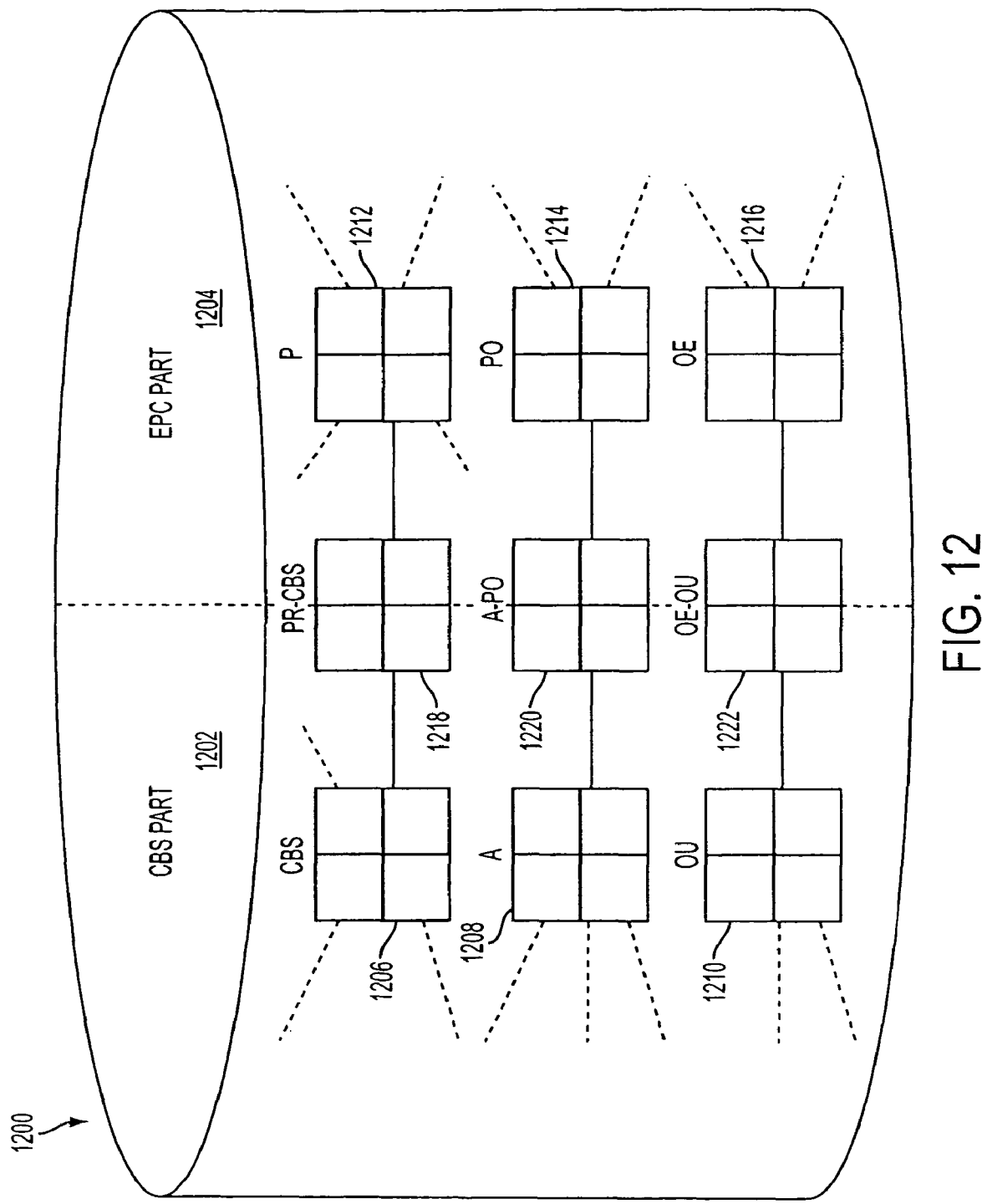
FIG. 12 illustrates a linked database that portrays how event driven process chains are changed in view of collaborative business scenarios; in accordance with an exemplary embodiment.

FIG. 11 is a flowchart further illustrating a process 308 for deriving the pre-configured set of event driven process chains of FIG. 3, in accordance with an exemplary embodiment. First, impacted EPC's are identified at operation 1102. Then, changes are made to the identified EPC's, based on CBS's, at an operation 1104. Finally, at an operation 1106, consistency is re-established in the EPC model-base. FIG. 12 illustrates a linked database 1200 that portrays how event driven process chains are changed in view of collaborative business scenarios; in accordance with an exemplary embodiment. Database 1200 is divided into two parts: a CBS part 1202 and an EPC part 1204. CBS tables are indicated at 1206, 1208 and 1210 while EPC tables are located at 1212, 1214 and 116. EPC's are changed in view of CBS's via tables 1218, 1220 and 1222.

Figure 13:
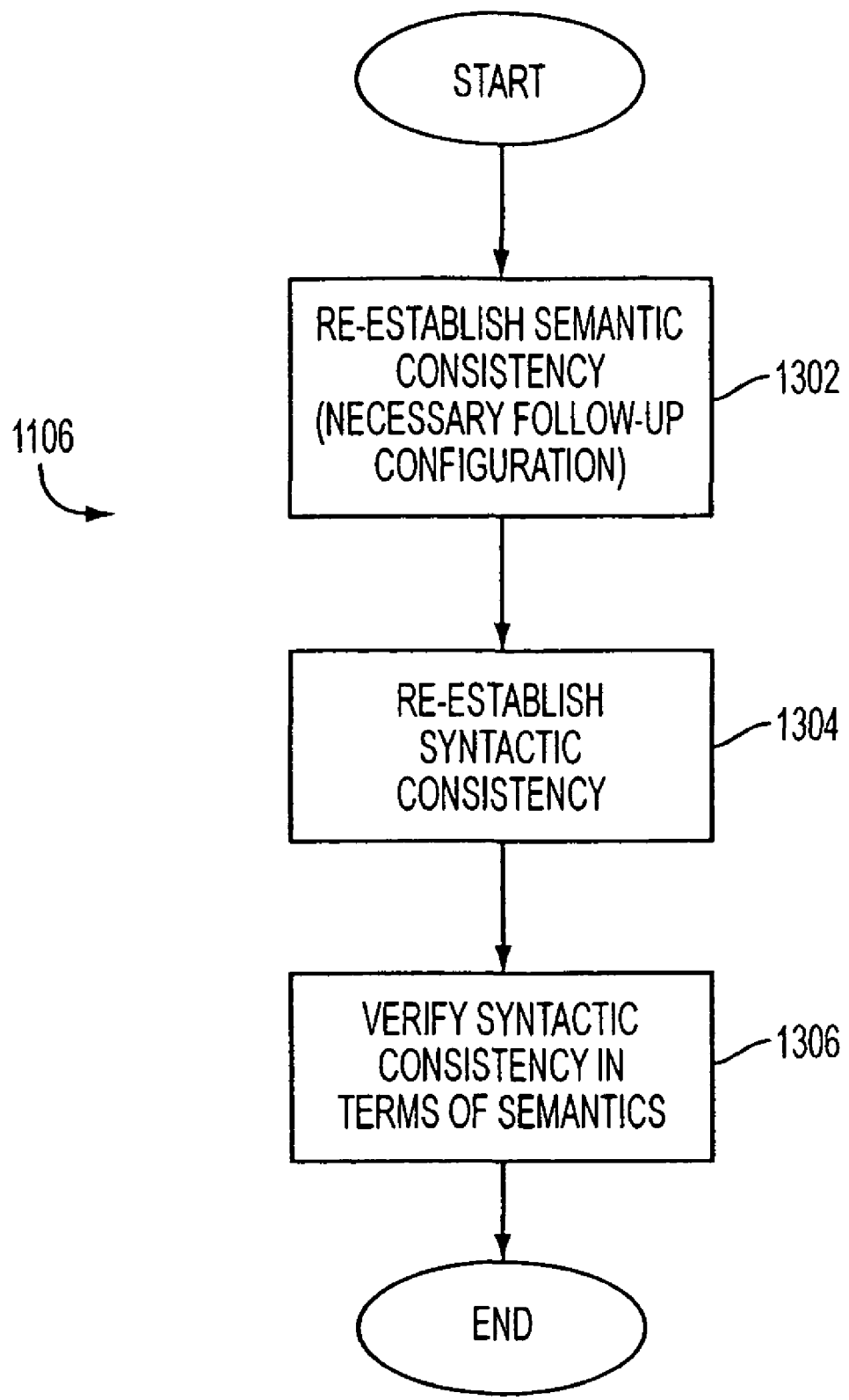
FIG. 13 is a flowchart further illustrating the process 1106 for re-establishing consistency in the event driven process chain model-base of FIG. 11, in accordance with an exemplary embodiment.

FIG. 13 is a flowchart further illustrating the process 1106 for re-establishing consistency in the event driven process chain model-base of FIG. 11, in accordance with an exemplary embodiment. At an operation 1302, semantic consistency is re-established and then syntactic consistency is re-established, at an operation 1304. Syntactic consistency is then verified in terms of the semantics, at operation 1306.

Figure 14:
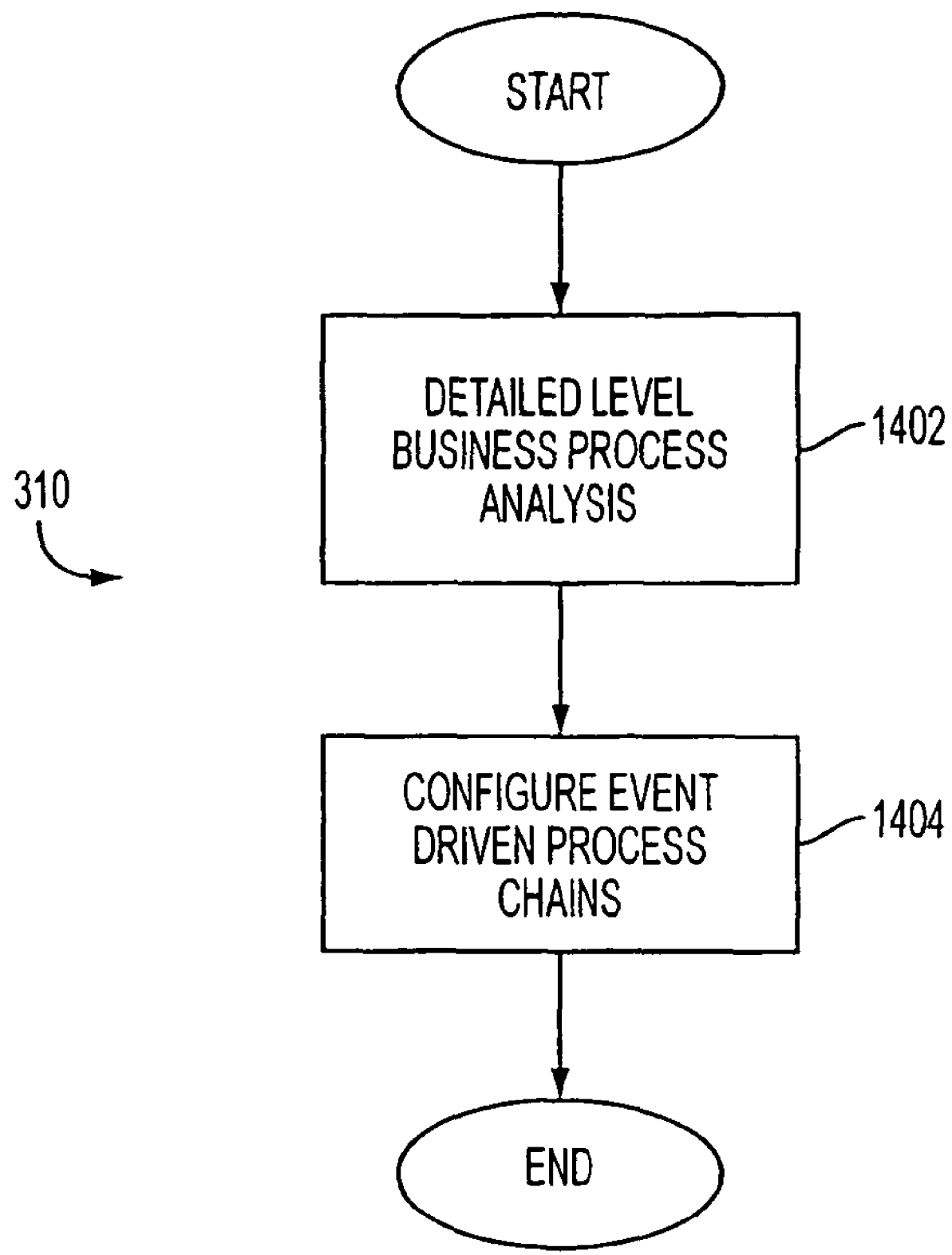
FIG. 14 is a flowchart further illustrating the process 310 for configuring the pre-configured set of event driven process chains, in accordance with an exemplary embodiment.

FIG. 14 is a flowchart further illustrating the process 310 for configuring the pre-configured set of event driven process chains, in accordance with an exemplary embodiment. First, a detailed-level business analysis is undertaken at an operation 1402. Then, event driven process chains are configured, at an operation 1404, based on the analysis.

Figure 15A:
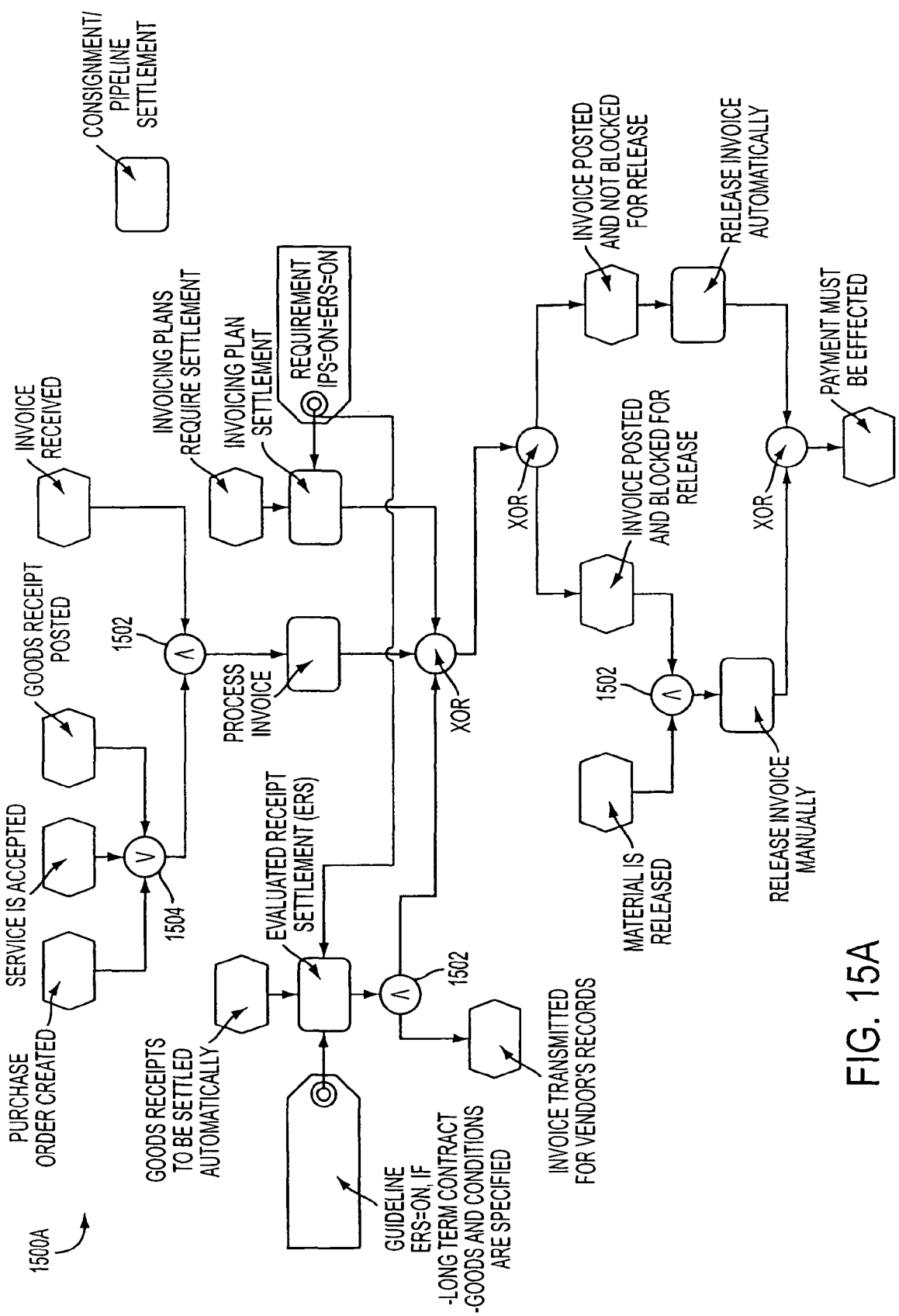
FIG. 15A is an exemplary block diagram illustrating a pre-configured event driven process chain, in accordance with an exemplary embodiment.

FIG. 15A is an exemplary block diagram illustrating a pre-configured event driven process chain 1500A, in accordance with an exemplary embodiment. EPC's "out of the box", are pre-configured in that they are set up to resemble a generic business process and are then customized or further configured to fit the activities of the target organization. Pre-configured process chain 1500A describes a generic process of invoicing and payment.

Figure 15B:
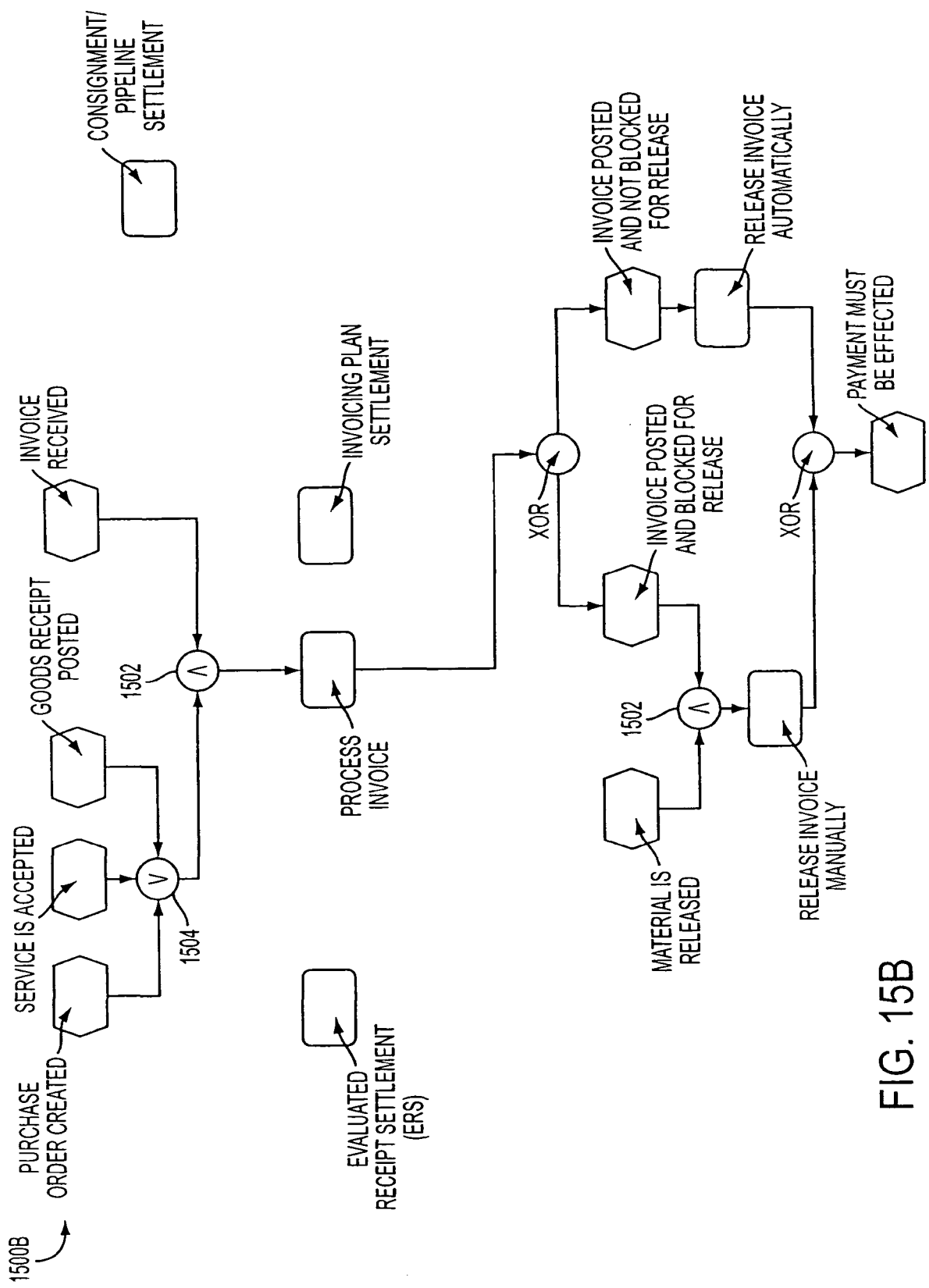
FIG. 15B is an exemplary block diagram illustrating a configured pre-configured event driven process chain, in accordance with an exemplary embodiment.

FIG. 15B is an exemplary block diagram illustrating a configured pre-configured event driven process chain 1500B, in accordance with an exemplary embodiment. Process 1500B only includes a subset of the process chain 1500A because this particular organization's invoicing/payment process is not that complicated. It should be noted that process chain 1500A is merely a starting point and that it very well become more complicated as opposed to less comprehensive when applied to define an organization's processes. For clarity, it should also be noted that symbol 1502 represents an "AND" function and that symbol 1504 represents an inclusive "OR" function. Furthermore, "XOR" refers to an exclusive "OR" function.

Figure 16:
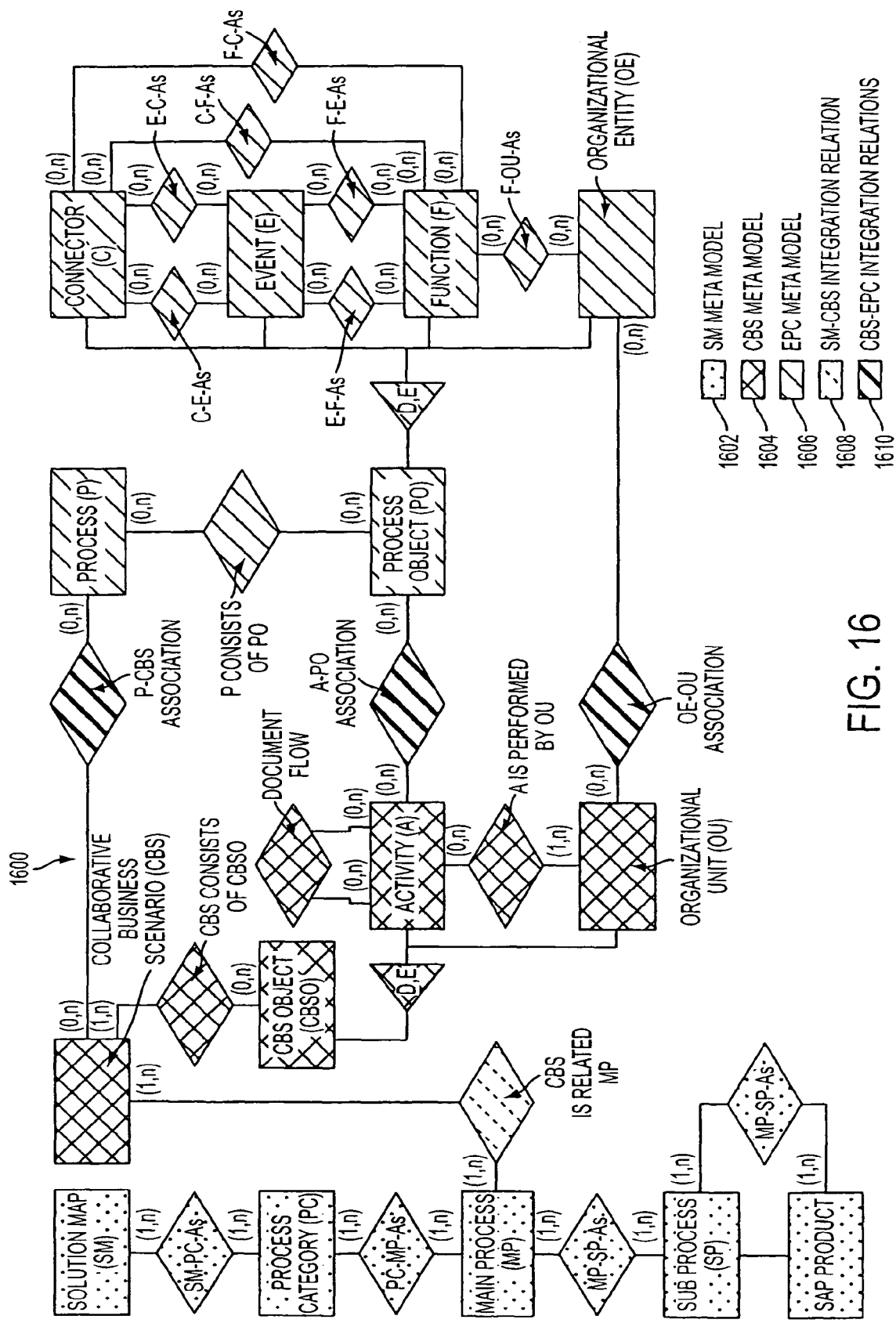
FIG. 16 is an exemplary block diagram illustrating a completed meta-model, in accordance with an exemplary embodiment.

FIG. 16 is an exemplary block diagram illustrating a completed meta-model 1600, in accordance with an exemplary embodiment. The completed meta-model is divided into various sub-models (as indicated by the associated shading) such as the solution map model 1602, collaborative business scenario model 1604 and event driven process model 1606. Additionally included is SM-CBS integration relation 1608 and CBS-EPC integration relation 1610.

Figure 17:
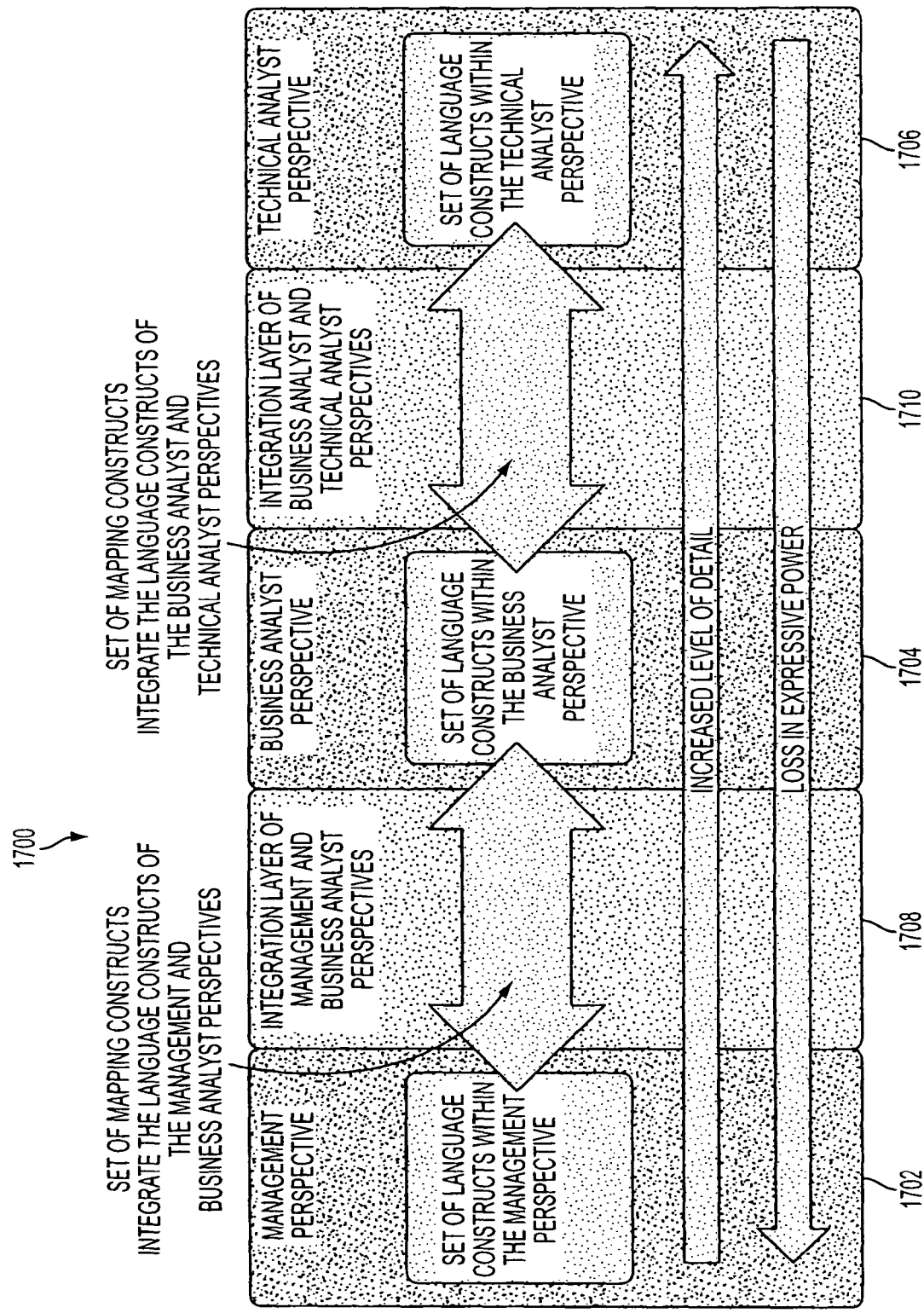
FIG. 17 is a block diagram illustrating various perspectives involved in implementing enterprise resource project software.

FIG. 17 is a block diagram 1700 illustrating various perspectives involved in implementing enterprise resource project software. Included in block diagram 1700 are, as an example, three perspectives: management perspective 1702, business analyst perspective 1704 and technical analyst perspective 1706. Management perspective 1702 is the most high-level and does not include many details. Technical analyst perspective 1706 contains all the required details for implementing ERP software. In the middle, there is the business analyst perspective 1704 which has a level of detail in between that of management 1702 and technical analyst. To help the various perspectives to implement the ERP software, there are integration layers 1708 and 1710. Integration layer 1708 is located between the management perspective 1702 and the business analyst perspective 1704 and helps to correctly map each perspective to each other. Similarly, integration later 1710 is located in between business analyst perspective 1704 and technical analyst perspective 1706 and helps to map each perspective to each other.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. A computer-implemented method executed in a computer system to support a software installation, the method comprising:
    configuring a solution map, the solution map comprising a list of operations and tasks obtained from a linked database associated with the computer system, each of the tasks being shown on a display once the task is clicked;
    deriving a pre-configured set of collaborative business scenarios from collaborative business scenarios stored in the linked database associated with the computer system based on the solution map, the deriving comprising:
        identifying one or more impacted collaborative business scenarios;
        making changes to the one or more impacted collaborative business scenarios based on the configured solution map; and
        re-establishing consistency in a collaborative business scenario model-base by re-establishing a semantic consistency and re-establishing a syntactic consistency, the re-establishing the semantic consistency comprising removal of functions resulting from a deletion of a related function and the re-establishing the syntactic consistency comprising conforming to rules of a modeling technique;
    configuring the pre-configured set of collaborative business scenarios;
    deriving a pre-configured set of event driven process chains from event driven process chains stored in a second linked database associated with the computer system based on the configured set of collaborative business scenarios; and
    configuring the pre-configured set of event driven process chains.

2. The computer-implemented method as recited in claim 1 wherein the solution map is configured based on a business blueprint.

3. The computer-implemented method as recited in claim 1 wherein reestablishing consistency in the collaborative business scenario model-base further comprises verifying the syntactic consistency in terms of the semantic consistency.

4. The computer-implemented method as recited in claim 1 wherein configuring the pre-configured set of collaborative business scenarios comprises:
    performing a high-level business process analysis; and
    configuring the pre-configured set of collaborative business scenarios based on the high-level business process analysis.

5. The computer-implemented method as recited in claim 1 wherein deriving the pre-configured set of event driven process chains comprises:
   identifying one or more impacted event driven process chains;
   making changes to the one or more impacted event driven process chains based on the configured set of collaborative business scenarios; and
   re-establishing syntactical consistency in an event driven process chain model-base.

6. The computer-implemented method as recited in claim 5 wherein reestablishing consistency in the event-driven process chain model-base comprises:
   re-establishing a semantic consistency;
   re-establishing a syntactic consistency; and
   verifying the syntactic consistency in terms of the semantic consistency.

7. The computer-implemented method as recited in claim 1 wherein configuring the pre-configured set of event driven process chains comprises:
   performing a detailed-level business process analysis; and
   configuring the pre-configured set of event driven process chains based on the detailed-level business process analysis.

8. A computer-implemented method executed by a computer system to support a software installation, the method comprising:
   configuring a solution map based on a business blueprint, the solution map comprising a list of operations and tasks obtained from a linked database associated with the computer system, each of the tasks being shown on a display once the task is clicked;
   deriving a pre-configured set of collaborative business scenarios from collaborative business scenarios stored in the linked database associated with the computer system based on the solution map wherein deriving the pre-configured set of collaborative business scenarios includes:
      a) identifying one or more impacted collaborative business scenarios;
      b) making changes to the one or more impacted collaborative business scenarios based on the configured solution map; and
      c) re-establishing consistency in a collaborative business scenario model-base by re-establishing a semantic consistency and re-establishing a syntactic consistency, the re-establishing the semantic consistency comprising removal of functions resulting from a deletion of a related function and the re-establishing the syntactic consistency comprising conforming to rules of a modeling technique;
   configuring the pre-configured set of collaborative business scenarios wherein configuring the pre-configured set of collaborative business scenarios includes;
      a) performing a high-level business process analysis; and
      b) configuring the pre-configured set of collaborative business scenarios based on the high-level business process analysis;
   deriving a pre-configured set of event driven process chains from event driven process chains stored in a second linked database associated with the computer system based on the configured set of collaborative business scenarios wherein deriving the preconfigured set of event driven process chains includes:
      a) identifying one or more impacted event driven process chains in a second linked database associated with the computer system;
      b) making changes to the one or more impacted event driven process chains based on the configured set of collaborative business scenarios; and
      c) re-establishing syntactical consistency in an event driven process chain model-base; and
   configuring the pre-configured set of event driven process chains wherein configuring the pre-configured set of event driven process chains includes:
      a) performing detailed-level analysis; and
      b) configuring the pre-configured set of event driven process chains based on the detailed-level business process analysis.

9. The computer-implemented method as recited in claim 8 wherein reestablishing the consistency in the collaborative business scenario model-base further comprises verifying the syntactic consistency in terms of the semantic consistency.

10. The computer-implemented method as recited in claim 8 wherein reestablishing consistency in the event-driven process chain model-base comprises:
   re-establishing a semantic consistency;
   re-establishing a syntactic consistency; and
   verifying the syntactic consistency in terms of the semantic consistency.

* * * * *